United States Patent
Seong et al.

(10) Patent No.: US 9,553,518 B2
(45) Date of Patent: Jan. 24, 2017

(54) METHOD AND APPARATUS FOR CONTROLLING CURRENT OF MULTI-PHASE INTERLEAVED CONVERTER

(71) Applicant: Hyundai Motor Company, Seoul (KR)

(72) Inventors: Hyun Wook Seong, Gyeonggi-Do (KR); Hui Sung Jang, Gyeonggi-do (KR); Shin Hye Chun, Jeollanam-do (KR); Mu Shin Kwak, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/559,663

(22) Filed: Dec. 3, 2014

(65) Prior Publication Data

US 2016/0028312 A1    Jan. 28, 2016

(30) Foreign Application Priority Data

Jul. 28, 2014   (KR) .................. 10-2014-0095952

(51) Int. Cl.
*H02M 3/158*   (2006.01)
*H02M 3/156*   (2006.01)

(52) U.S. Cl.
CPC ........... *H02M 3/1584* (2013.01); *H02M 3/156* (2013.01); *H02M 3/158* (2013.01); *H02M 2003/1586* (2013.01)

(58) Field of Classification Search
CPC .................................................. H02M 3/156
USPC ........................................ 323/271, 272, 222
See application file for complete search history.

(56) References Cited

U.S. PATENT DOCUMENTS

| | | |
|---|---|---|
| 6,628,106 B1 * | 9/2003 | Batarseh ............... H02M 3/156 323/222 |
| 7,466,116 B2 | 12/2008 | Sato et al. |
| 2007/0262758 A1 | 11/2007 | Wildash |
| 2009/0079373 A1 | 3/2009 | Nagase et al. |
| 2009/0102436 A1 | 4/2009 | Escobar Valderrama et al. |
| 2010/0090670 A1 | 4/2010 | Kelly |
| 2013/0114306 A1 | 5/2013 | Kooken et al. |

(Continued)

FOREIGN PATENT DOCUMENTS

| | | |
|---|---|---|
| JP | 2010-041867 A | 2/2010 |
| KR | 10-1500206 B1 | 3/2015 |

OTHER PUBLICATIONS

Mao, Hong et al., "Analysis of Inductor Current Sharing in Nonisolated and Isolated Multiphase dc-dc Converters", IEEE Transactions on Industrial Electronics, vol. 54, No. 6 (Dec. 2007) pp. 3379-3388.

(Continued)

*Primary Examiner* — Matthew Nguyen
*Assistant Examiner* — Trinh Dang
(74) *Attorney, Agent, or Firm* — Mintz Levin Cohn Ferris Glovsky and Popeo, P.C.; Peter F. Corless

(57) ABSTRACT

A method and apparatus for controlling a current of a multi-phase interleaved converter are provided. The method includes filtering, through a filter, currents flowing into converters of respective phases in a multi-phase interleaved converter having multiple phases, The method further includes receiving values of the filtered currents for respective phases and a duty ratio for any one of the multiple phases generated in response to a current flowing into the phase and adjusting duty ratios for phases other than the phase, based on the received current values for respective phases.

17 Claims, 7 Drawing Sheets

(56) References Cited

U.S. PATENT DOCUMENTS

| | | |
|---|---|---|
| 2013/0320951 A1 | 12/2013 | Wu et al. |
| 2014/0167711 A1 | 6/2014 | Thenus et al. |
| 2014/0191736 A1* | 7/2014 | Babazadeh ......... H02M 3/1582 323/271 |
| 2015/0145337 A1* | 5/2015 | Lee ..................... G05F 1/625 307/52 |
| 2015/0280563 A1* | 10/2015 | Tang .................. H02M 3/158 323/271 |

OTHER PUBLICATIONS

Extended European Search Report for European Patent Application No. 14196269.6, dated Jan. 7, 2016, 8 pages.

\* cited by examiner

METHOD AND APPARATUS FOR CONTROLLING CURRENT OF MULTI-PHASE INTERLEAVED CONVERTER

CROSS REFERENCE TO RELATED APPLICATION(S)

Pursuant to 35 U.S.C. §119(a), this application claims priority to Korean Patent Application Number 10-2014-0095952 filed on Jul. 28, 2014, the entire contents of which are incorporated herein by reference.

BACKGROUND

Technical Field

The present invention relates to a method and apparatus for controlling a current of a multi-phase interleaved converter and, more particularly, to a method and apparatus for controlling a current of a multi-phase interleaved converter to reduce load on a Micro Controller Unit (MCU) ( )and redress a current imbalance of a multi-phase interleaved converter.

Background Art

Today, direct current to direct current (DC/DC) converters are applied to various electric power converters such as vehicle battery chargers. When a voltage is boosted using a DC/DC converter, a ripple current may occur in the inductor of the converter. Such a ripple current affects the size constraints of elements such as inductors and capacitors, and is closely related with an amount of power loss. Interleaving refers to a method in which the mix of currents flowing with different phases causes their ripple currents to be offset by one another, to cause the combined ripple current to decrease in magnitude by 1/N times whereas the frequency increases by N times; where N denotes the number of phases.

An interleaved converter connects multiple DC/DC converters in parallel to disperse electric current and uses the phase difference of switching elements to reduce the magnitude and ripple of currents flowing through elements such as inductors. The converter may disperse electric current and allow an appropriate level of phase difference for the current, to significantly decrease the ripple of input and output currents. In addition, the use of such an interleaved converter may increase energy efficiency and adjust the size of elements in the circuit.

An interleaved converter generally has a structure similar to a parallel connection of multiple single-phase converters. For example, in a three-phase interleaved converter, each switch operates with a phase difference of 120 degrees. An N-phase interleaved converter has the same structure as the parallel connection of N single-phase converters, in which each switch operates with a phase difference of $(2\pi/N)(rad)$. In an interleaved converter, an increase in the number of phases may require an increase in the number of elements needed in the circuit.

There are two methods of controlling a current of interleaved converters which include: sensing a multi-phase current on multiple phases and applying current controllers that correspond to respective phases to generate duty ratios for respective phases; and applying a current controller for one phase to phase-shift the same duty ratio for other phases by a fixed size. However, in the first method, separate current controllers are required for respective phases, thus increasing the load on the MCU. In the second method, a current change in a phase having no current controller may be difficult to reflect.

SUMMARY

An object of the present invention is to provide a method and an apparatus for controlling a current of a multi-phase interleaved converter to reflect changes in currents flowing through respective phases to generate more precise duty ratios that correspond to respective phases to adjust currents of respective phases in a balanced way.

A method of controlling a current of a multi-phase interleaved converter according to an exemplary embodiment of the present invention may include: operating, by a controller, a filter, to filter currents flowing into converters of respective phases in a multi-phase interleaved converter having multiple phases; receiving, by the controller, values of the filtered currents for respective phases and a duty ratio for any one of the multiple phase generated in response to a current flowing into the phase; and adjusting, by the controller, duty ratios for phases other than the phase based on the received current values for respective phases.

The filtering may include smoothing into direct current values currents flowing into converters of respective phases in the multi-phase interleaved converter and flowing through inductors included in each of the converters. The filtering may be performed by a filter having a time constant greater than a predetermined reference value. The duty ratio for the phase may be generated during a first cycle. The adjustment of the duty ratios may be performed during a second cycle. The duty ratio for the phase may be generated during a first cycle and the adjustment of the duty ratios may be performed during a second cycle. The second cycle may be longer than the first cycle. The adjustment of the duty ratios may include reducing the duty ratios for a greater received current value by comparing the received current values for respective phases. The adjustment of the duty ratios may also include adjusting the received current values for respective phases and duty ratios for phases other than the phase based on a phase difference between the phases. The method may further include adjusting switching of the converters based on the adjusted duty ratios.

An apparatus for controlling a current of a multi-phase interleaved converter according to an exemplary embodiment of the present invention may include: a filter configured to filter currents flowing into converters of respective phases in a multi-phase interleaved converter having multiple phases; and an interleave controller having a current controller configured to sense a current flowing into any one of the multiple phases to generate a duty ratio for a phase that correspond to the current, and a balancing controller configured to receive values of currents for respective phases, filtered by the filter, and a duty ratio generated by the current controller to adjust duty ratios for phases other than the phase based on the received current values for respective phases. The filter may be configured to smooth, into direct current values, currents that correspond to respective phases received by the filter. The time constant of the filter may be greater than a predetermined reference value. The current controller may be configured to generate a duty ratio for the phase during a first cycle. The balancing controller may be configured to adjust duty ratios for phases other than the phase during a second cycle.

Further, the current controller may be configured to generate a duty ratio for the phase during a first cycle, and the balancing controller may be configured to adjust duty ratios for phases other than the phase during a second cycle.

The second cycle may be longer than the first cycle. The balancing controller may be configured to reduce a duty ratio for a greater received current value by comparing the received current values for respective phases. The apparatus may further include a phase shifter configured to apply a phase difference between the phases to duty ratios adjusted by the balancing controller and transmit the duty ratios with the phase difference applied to the converters for respective phases.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

Figure 1A:
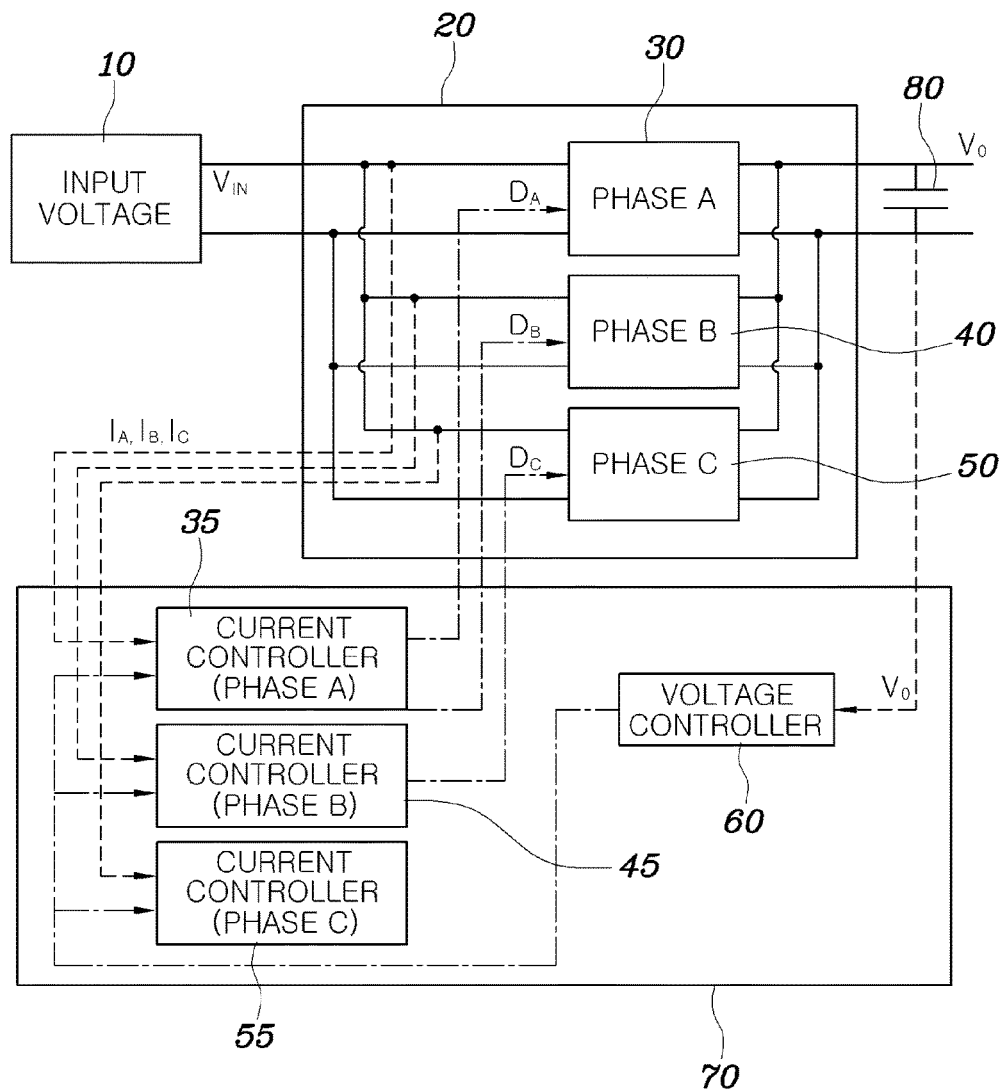
FIG. 1A through FIG. 2C are exemplary diagrams for existing methods of controlling a current of a multi-phase interleaved converter according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiments are described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The specific structural or functional descriptions about exemplary embodiments of the present invention disclosed in the specification or application are examples given only for the purpose of describing exemplary embodiments of the invention. The exemplary embodiments of the invention may be practiced in various forms and the invention should not be interpreted as limited to the exemplary embodiments described in the specification or application. Since exemplary embodiments of the invention may be modified in various ways and have various forms, exemplary embodiments are exemplified in drawings and described in detail in the specification or application. However, this is not to limit the exemplary embodiments of the invention to specific disclosure forms and should be understood as including every modification, equivalent or replacement within the spirit or technology of the invention.

When one component is mentioned to be "linked" or "connected" with another component, the one component may be directly linked or connected with the another component, but it should be understood that still another component may exist between the two components. Meanwhile, when one component is mentioned to be "directly linked" or "directly connected" with another component, it should be understood that no other component exists between the two components. The same applies to other expressions for explaining a relationship between components, such as "among" and "right among" or "next to" and "right next to."

Herein below, the invention is described in detail by explaining exemplary embodiments with reference to the accompanying figures. The same reference numerals are used throughout the different drawings to designate the same components.

FIG. 1A through FIG. 2C are exemplary diagrams for existing methods of controlling a current of a multi-phase interleaved converter. Referring to FIG. 1A, an output from an input voltage source (Vin) 10 is converted using a three-phase interleaved converter, and a controller (MCU) 20 operating converters 30, 40 and 50 in charge of respective phases (phase A, phase B and phase C) is equipped with current controllers 35, 45 and 55 for the converters 30, 40 and 50, respectively. In other words, the converter 30 in charge of phase A has the current controller 35 in charge of phase A, the converter 40 in charge of phase B has the current controller 45 in charge of phase B, and the converter 50 in charge of phase C has the current controller 55 in charge of phase C.

In the interleaved converter 20, a voltage of an output stage capacitor 80 may be measured and transmitted to each current controller 35, 45 and 55 by a voltage controller 60, and the current controllers 35, 45, and 55 for respective phases generate duty ratios to adjust respective phases and transmit the duty ratios to the interleaved converter 20 to adjust a current output from the converter 20.

Figure 1B:
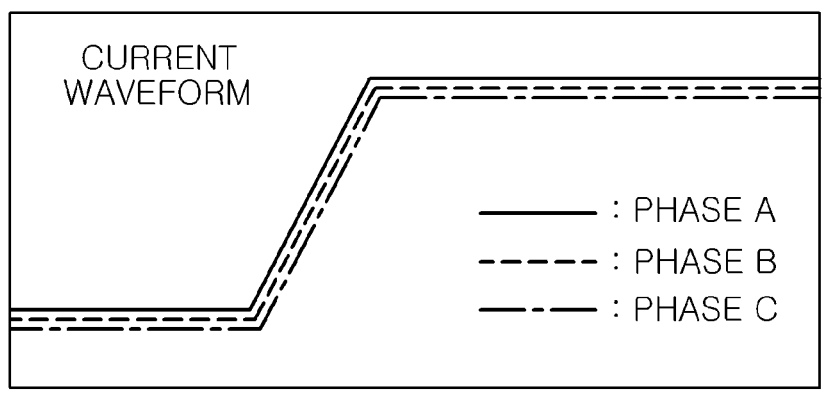
Figure 1C:
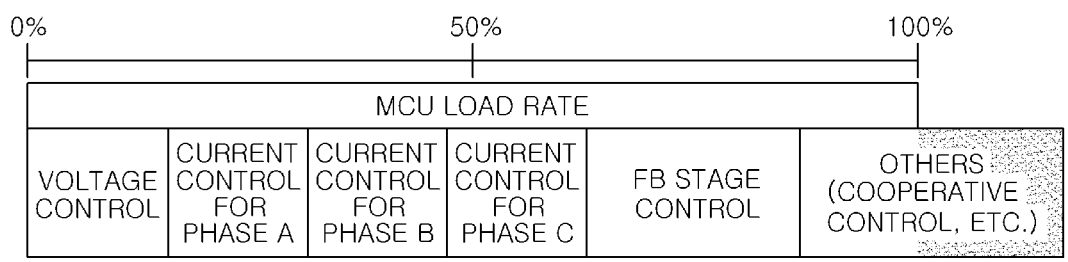

Therefore, equipping the current controllers 35, 45 and 55 in charge of respective phases may achieve a balance of currents output from respective phases as illustrated in FIG. 1B, however, the load on the MCU increases as illustrated in FIG. 1C.

Figure 2A:
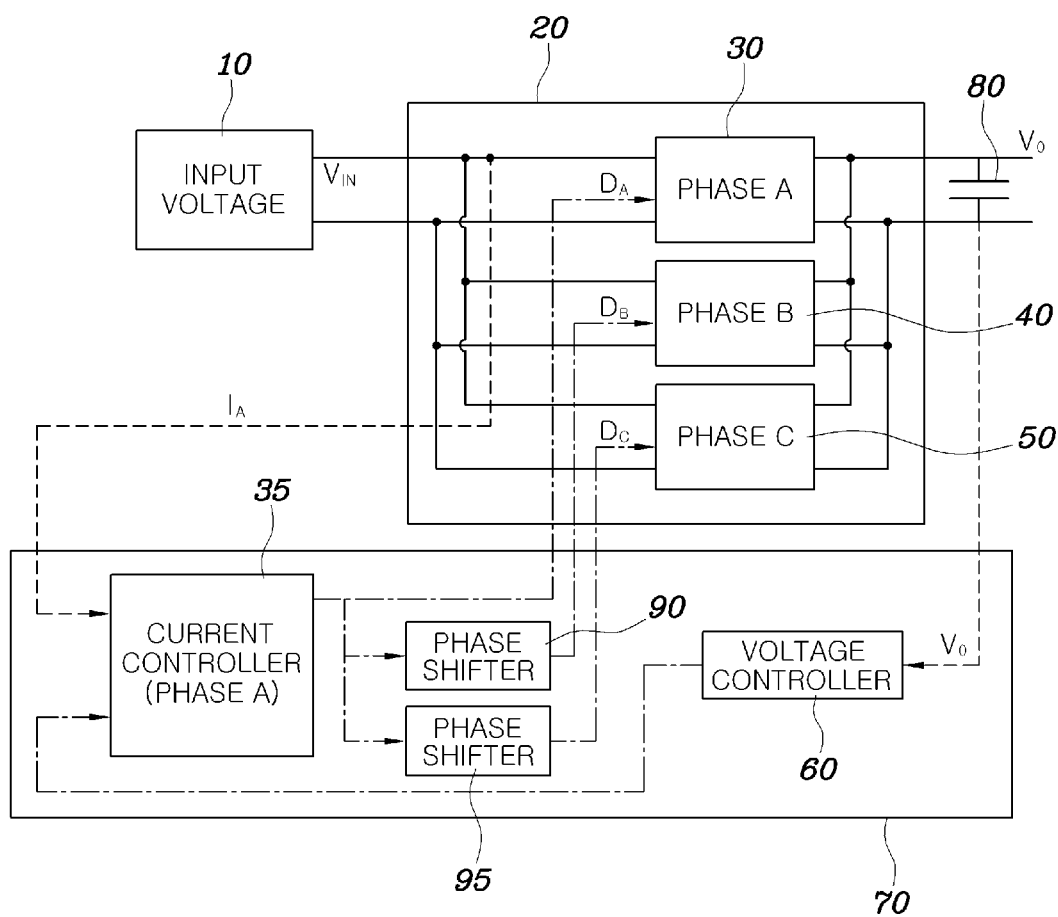
Figure 2B:
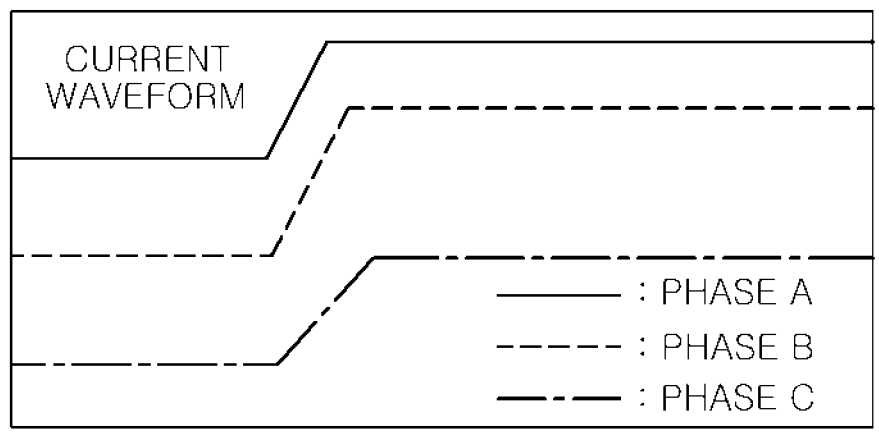
Figure 2C:
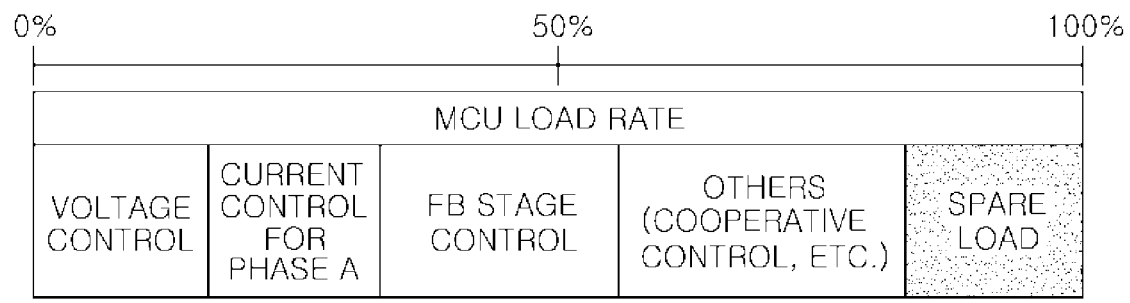

FIGS. 2A through FIG. 2C are exemplary diagrams for existing methods having one current controller 35 for the interleaved converter 20. The interleaved converter 20 in FIG. 2A may be configured to transmit an output from the input voltage source 10 using the three-phase interleaved converter 20, and operate the converters 30, 40 and 50 in charge of respective phases using one current controller 35. An output signal from the current controller 35 may be phase-shifted to operate an interleaved converter for another phase. For example, in the interleaved converter 20 with phase A, phase B and phase C, when the current controller 35 is in charge of phase A, the converters 40 and 50 in charge of phase B and phase C may phase-shift by about 120 degrees an output signal from the current controller 35 in charge of phase A using phase-shifters 90 and 95 to adjust phase B and phase C. In other words, one current controller may be used to generate a signal with a duty ratio for adjusting a current of the converter 30 that corresponds to the one current controller, and the converters 40 and 50 for other phases may be operated by phase-shifting a signal with the same duty ratio by about 120 degrees. This method has an advantage of reducing the load on the MCU, but also has a problem in that it does not instantly reflect precise current changes in other phases and therefore may cause a current imbalance.

Figure 3A:
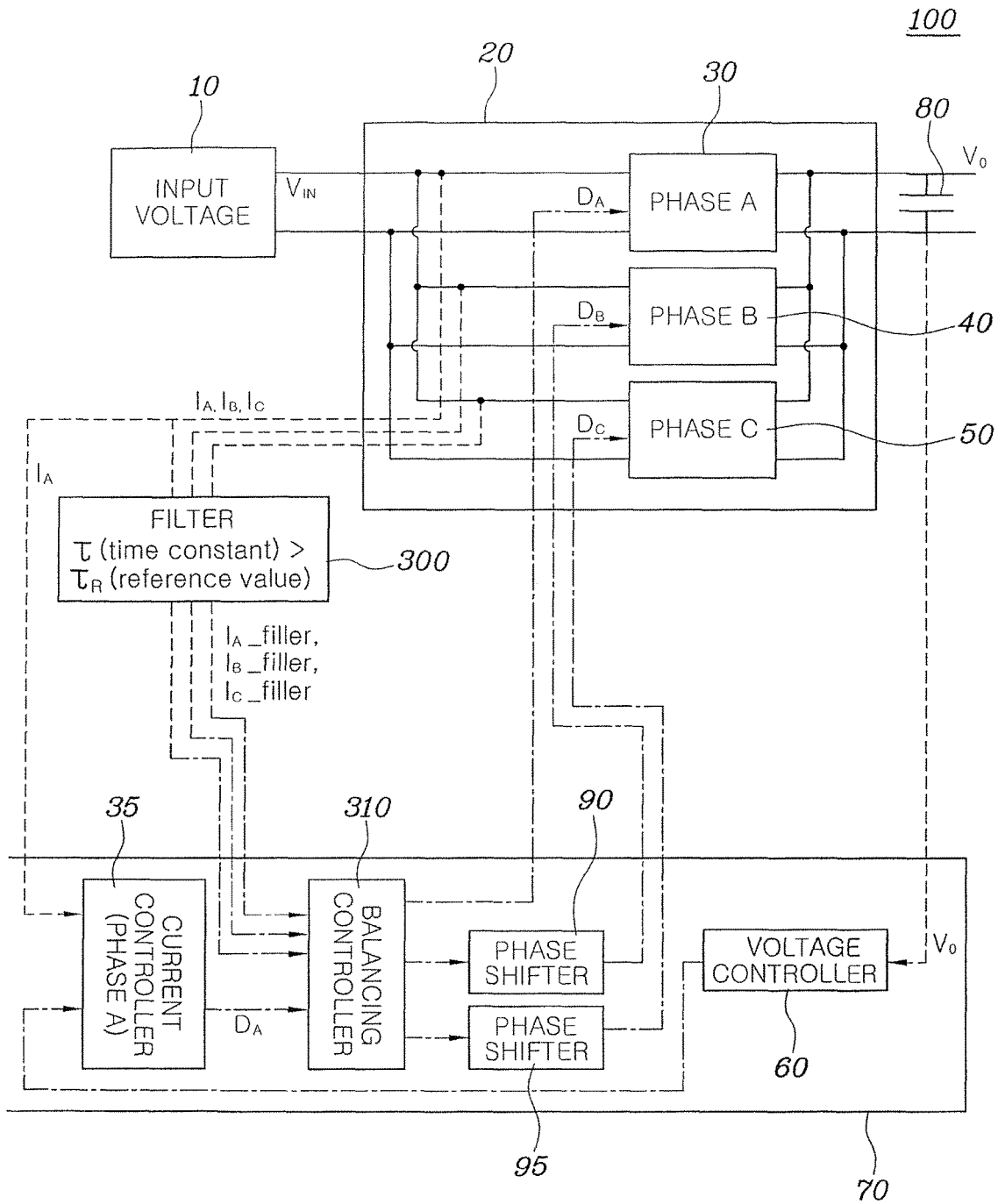
FIG. 3A through FIG. 3C are exemplary diagrams for a method and an apparatus for controlling a current of a multi-phase interleaved converter according to an exemplary embodiment of the present invention.
Figure 3B:
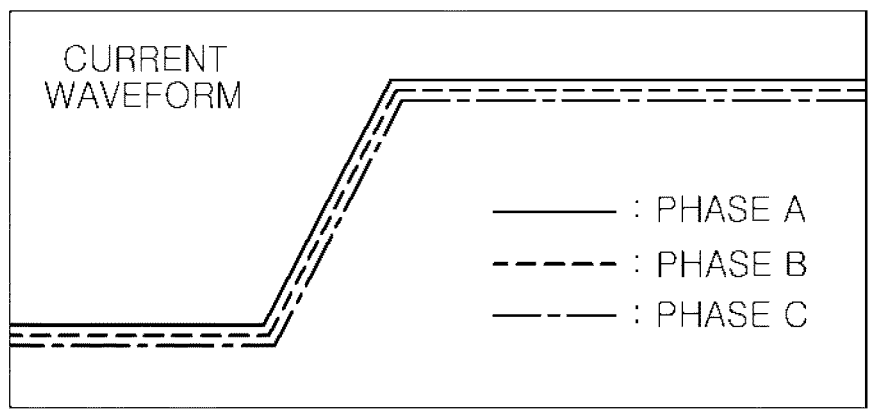
Figure 3C:
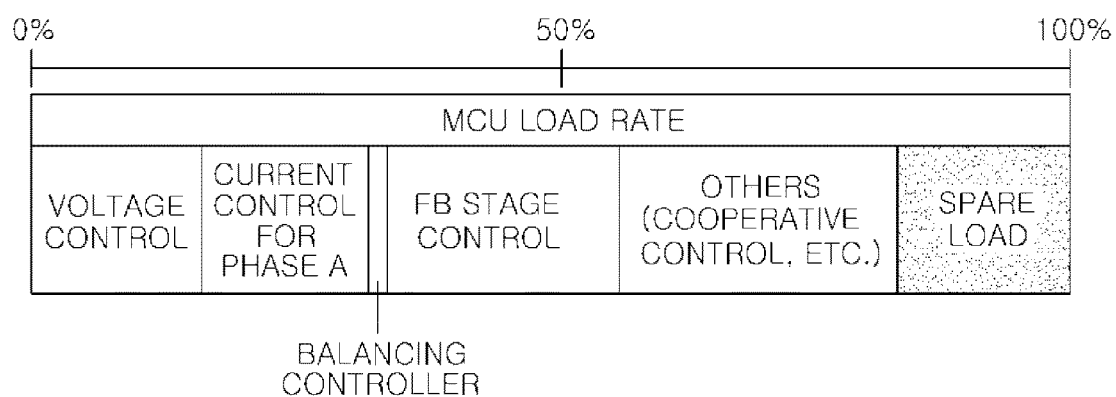
Figure 4:
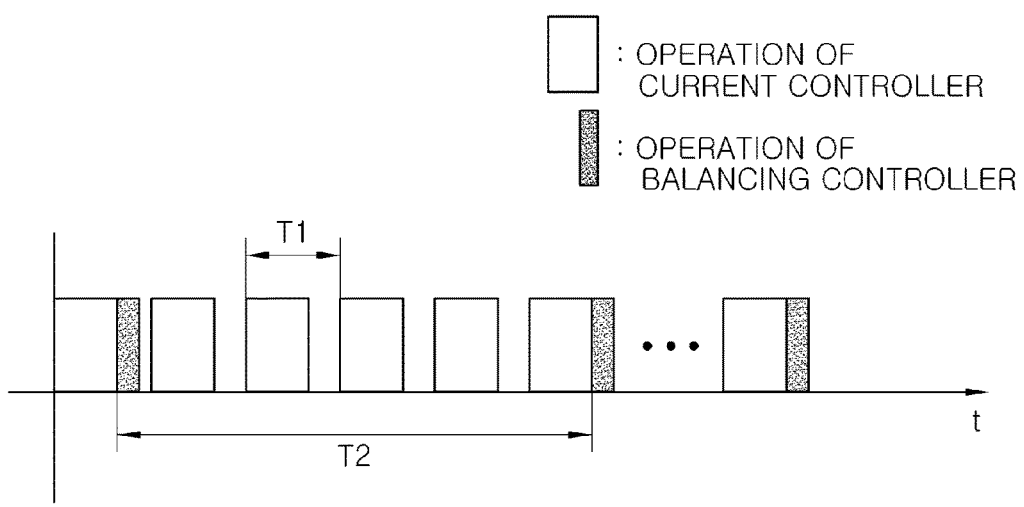
FIG. 4 is an exemplary graph illustrating operation cycles of the current controller and the balancing controller depicted in FIG. 3 according to an exemplary embodiment of the present invention.

FIG. 3A through FIG. 3C are exemplary diagrams for a method and an apparatus for controlling a current of a multi-phase interleaved converter according to an exemplary embodiment of the present invention. FIG. 4 is an exemplary graph illustrating operation cycles of the current controller and the balancing controller depicted in FIG. 3.

Referring to FIG. 3a, a current control device 100 of the multi-phase interleaved converter according to an exemplary embodiment of the invention may include an input voltage source 10, a multi-phase interleaved converter 20, a filter 300 and an interleave controller 70. The input voltage source 10 is a power input into the multi-phase interleaved converter 20, and the multi-phase interleaved converter 20 may be configured to convert an input voltage (Vin) into an output voltage (Vo). The multi-phase interleaved converter 20 may be, for example, a parallel connection of converters for phase A, phase B and phase C. An output stage of each converter may be connected with an output stage capacitor 80. The filter 300 may be configured to filter current inputs from the multi-phase interleaved converter 20 having multiple phases into the converters 30, 40 and 50 for respective phases. More specifically, the filter 300 may be configured to smooth all received currents that correspond to respective phases into direct current values to convert the direct current values into DC elements. The filter 300 may be, for example, a low pass filter, and a greater time constant of a low pass filter may lead to improved smoothing of a received current. In other words, the smaller the band width of the low pass filter 300, the more precisely the current received by the filter 300 may be smoothed into a DC current value. Meanwhile, the filter 300 may be either hardware-based or software-based.

The time constant of the filter 300 may be greater than a predetermined reference value, which is used to determine when the value of a current output from the filter 300 is a DC value. The filter 300 may be configured to eliminate AC elements as ripple elements and filter DC elements as offset elements. In other words, a current with ripple elements eliminated above a certain reference level may be considered a DC value. The interleave controller 70 may include a current controller 35 configured to sense a current (IA) flowing into any one of multiple phases to generate a duty ratio (DA) for a phase (phase A) that corresponds to the current and a balancing controller 310 configured to receive values of currents (IA_filter, IB_filter and IC_filter) for respective phases filtered by the filter 300 and the duty ratio (DA) generated in the current controller 35 to adjust duty ratios (DB and DC) for phases (phase B and phase C) other than the phase (phase A) based on the received current values (IA_filter, IB_filter and IC_filter) for respective phases.

In addition, the interleave controller 70 may further contain phase-shifters 90 and 95 configured to apply a phase difference between respective phases (e.g., about 120 degrees for three phases) to the duty ratios (DB and DC) adjusted in the balancing controller 310 and transmit the duty ratios (DB and DC) with the phase difference applied to the converters 40 and 50 for phase B and phase C. For reference, when the phase shifters 90 and 95 are disposed within the balancing controller 310, extra phase shifters 90 and 95 may be omitted, and when extra phase shifters 90 and 95 are installed, the phase shifters 90 and 95 in the balancing controller 310 may be omitted.

As illustrated in FIG. 4, the current controller 35 may be configured to generate a duty ratio (DA) for any one phase (phase A) during a first cycle (T1). The balancing controller 310 may be configured to adjust duty ratios (DB and DC) for phases (phase B and phase C) other than the phase (phase A) during a second cycle (T2). When the first cycle is longer than the second cycle, the adjusting time of the balancing controller 310 may decrease and subsequently the balancing controlling time may also decrease as illustrated in FIG. 3c, thereby significantly reducing the load rate of the interleave controller (MCU) 70. The balancing controller 310 may be configured to compare the received current values (IA_filter, IB_filter and IC_filter) for respective phases and adjust the duty ratios to cause decreased current values to decrease duty ratios. In other words, as the current values of respective phases increase, the duty ratios for respective phases may be adjusted to be decreased, and as the current values of respective phases are decreased, the duty ratios for respective phases may be adjusted to increase.

Current waveforms for respective phases may be obtained as illustrated in FIG. 3b after a phase-shift by the phase-shifters 90 and 95 and a balancing of current values for respective phases by the balancing controller 310. In other words, the current control device 100 of the multi-phase interleaved converter 20 may be configured to convert currents flowing into respective phases of the interleaved converter 20 into DC values using the filter 300, operate the balancing controller 310 to compare the current values converted into DC values and adjust the duty ratios that correspond to each current, and phase-shift the duty ratios adjusted by the phase-shifter 90 and 95, thereby operating ON/OFF of switches installed in the converters 30, 40 and 50 that correspond to respective phases.

The method and apparatus for controlling a current of a multi-phase interleaved converter according to an exemplary embodiment of the invention may apply a current controller configured to generate duty ratios for respective phases to one phase, to reduce the load on the MCU controlling such current controllers and decreasing cost. In addition, the method and apparatus may reduce or substantially eliminate current imbalances for respective phases possibly resulting from some factors such as tolerance of an inductor and resistance.

As described above, the invention has been described with reference to exemplary embodiments, but those skilled in the art to which the invention pertains would understand that the invention can be modified and altered in various ways within the scope of the spirit and technology of the invention specified in the appended claims.

What is claimed is:

1. A method of controlling a current of a multi-phase interleaved converter, comprising:
    operating, by a controller, a filter, to filter input currents flowing into converters of respective phases in a multi-phase interleaved converter having multiple phases;
    receiving, by the controller, values of the filtered input currents for respective phases and a duty ratio for any one of the multiple phases generated in response to a current flowing into the respective phases; and
    adjusting, by the controller, duty ratios for phases other than the any one of the multiple phases based on the received current values for respective phases.

2. The method of claim 1, wherein the filtering of currents includes:
    smoothing, by the controller, into direct current values, the input currents flowing into converters of respective phases in the multi-phase interleaved converter and flowing through inductors included in each of the converters.

3. The method of claim 1, wherein a time constant of the filter is controlled by the controller to be greater than a predetermined reference value.

4. The method of claim 1, further comprising:
    generating, by the controller, a duty ratio for the any one of the multiple phases during a first cycle.

5. The method of claim 1, wherein the adjustment of the duty ratios is performed during a second cycle.

6. The method of claim 1, further comprising:
    generating, by the controller, a duty ratio for the any one of the multiple phases during a first cycle, wherein the adjustment of the duty ratios is performed during a second cycle, and the second cycle is longer than the first cycle.

7. The method of claim 1, further comprising:
    comparing, by the controller, received current values for the respective phases,
    wherein the adjustment of duty ratios includes decreasing a duty ratio for a greater received current value.

8. The method of claim 1, wherein the adjustment of the duty ratios includes:
    adjusting, by the controller, the received current values for the respective phases and duty ratios for phases other than the any one of the multiple phases based on a phase difference between the phases.

9. The method of claim 1, further comprising:
    adjusting, by the controller, switching of the converters based on the adjusted duty ratios.

10. An apparatus for controlling a current of a multi-phase interleaved converter, comprising:
    a filter configured to filter input currents flowing into converters of respective phases in a multi-phase interleaved converter having multiple phases; and
    an interleave controller configured to:
        sense a current flowing into any one of the multiple phases to generate a duty ratio for a phase that corresponds to the current; and
        receive values of currents for respective phases filtered by the filter and a generated duty ratio to adjust duty ratios for phases other than the any one of the multiple phases based on the received current values for respective phases.

11. The apparatus of claim 10, wherein the filter is configured to smooth the input currents that correspond to respective phases received by the filter into direct current values.

12. The apparatus of claim 10, wherein a time constant of the filter is controlled by the controller to be greater than a predetermined reference value.

13. The apparatus of claim 10, wherein the interleave controller is configured to generate a duty ratio for the any one of the multiple phases during a first cycle.

14. The apparatus of claim 10, wherein the interleave controller is configured to adjust duty ratios for phases other than the any one of the multiple phases during a second cycle.

15. The apparatus of claim 10, wherein the interleave controller is configured to generate a duty ratio for the receptive phases during a first cycle, the interleave controller is configured to adjust duty ratios for phases other than the any one of the multiple phases during a second cycle, and the second cycle is longer than the first cycle.

16. The apparatus of claim 10, wherein the interleave controller is configured to decrease a duty ratio for a greater received current value by comparing the received current values for respective phases.

17. The apparatus of claim 10 further comprising:
    a phase shifter configured to applying a phase difference between the phases other than the any one of the multiple phases to duty ratios adjusted by the interleave controller and transmit the duty ratios with the phase difference applied to the converters for respective phases.

* * * * *